Sept. 26, 1944.     H. L. LAMBERT     2,359,042

CIRCUIT CONTROLLER

Filed June 26, 1943

INVENTOR
Harry L. Lambert
BY
Parker Trochnow & Garnier
ATTORNEYS

Patented Sept. 26, 1944

2,359,042

UNITED STATES PATENT OFFICE 2,359,042

CIRCUIT CONTROLLER

Harry L. Lambert, Enfield, N. Y., assignor to Allen Wales Adding Machine Corporation, Ithaca, N. Y.

Application June 26, 1943, Serial No. 492,394

16 Claims. (Cl. 200—80)

This invention relates to electric circuit controllers, and more particularly to mercury tube switches which may be employed for controlling an electric circuit in response to varying centrifugal forces.

One object of the invention is to improve circuit controllers with mercury tube switches of the type which are operated by centrifugal forces.

Another object of the invention is to provide an improved mercury tube switch which may be operated by centrifugal forces to open or close a circuit at a selected speed; which may be rotated in order to create the centrifugal forces that open and close the circuit; which may be mounted directly on a shaft of an electric motor for rotation therewith; which may be employed to control the speed of such motor and maintain it within relatively close limits; with which the maximum speed above which it will not allow the motor to run may be varied or adjusted selectively within a considerable range; which will operate to control a circuit at a selected speed in any position in which the switch and motor may be placed; with which the speed at which the switch will operate to alter the condition of a circuit therethrough will be substantially independent of the position in which it is placed; with which the mercury tube of the switch may be easily replaced in a simple manner; and which will be relatively simple, compact and inexpensive.

Other objects and advantages will be apparent from the following description of one embodiment of the invention, and the novel features will be particularly pointed out hereinafter in connection with the appended claims.

Figure 1:
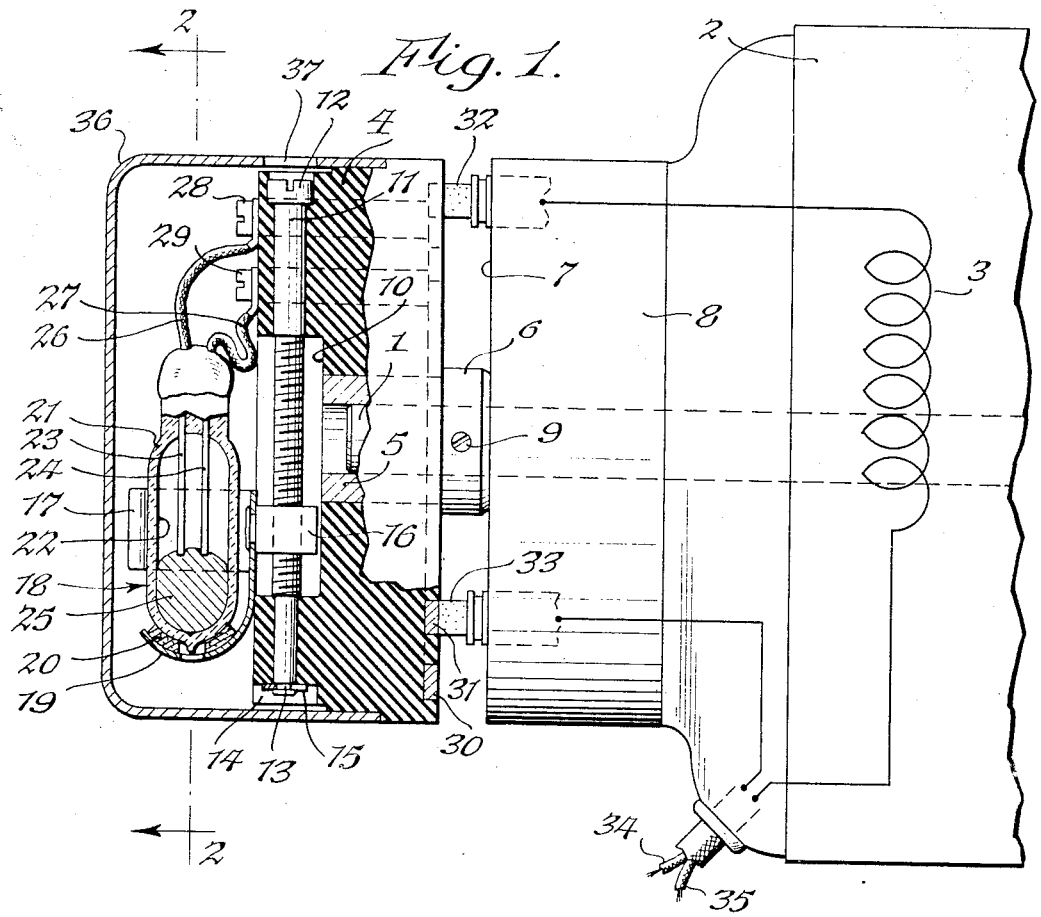
Fig. 1 is a side elevation of a motor having a mercury tube switch mounted on the shaft thereof and formed in accordance with this invention, the switch and part of its mounting being shown in section.
Figure 2:
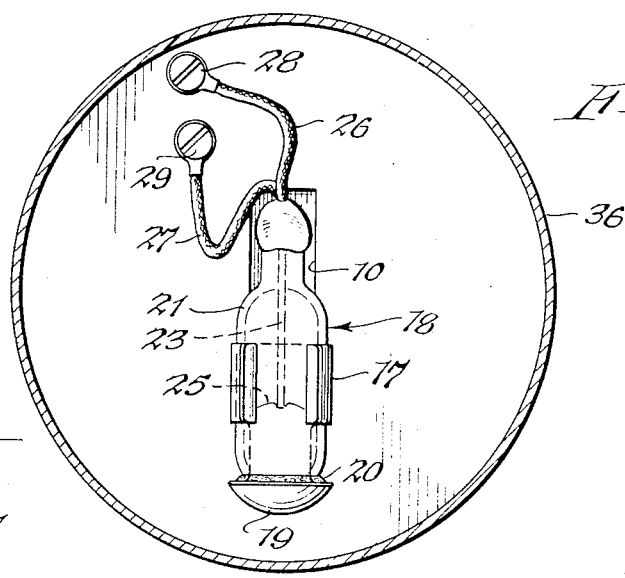
Fig. 2 is a transverse sectional elevation of the same, the section being taken approximately along the line 2—2 of Fig. 1.

In the illustrated embodiment of the invention, the mercury tube switch is shown as mounted upon the shaft 1 of the armature of any desired electric motor 2 of any suitable type, whose speed is to be controlled. The windings of this motor are shown only conventionally and diagrammatically at 3. Mounted removably upon the outer end of the shaft 1 is a body or mass 4 of suitable insulating material. This body or mass 4 may be provided with a metallic sleeve or bushing 5 extending in a direction from face to face thereof at a central zone, and which removably and telescopically fits the shaft 1. This bushing 5 is provided at one end with a collar 6 which spaces the mass 4 from the face 7 of a boss 8 on the end of the motor 2. The collar 6 may have a set screw 9 engageable with the shaft 1 by which the bushings 5 may be removably secured on the end of the shaft 1, but coupled thereto for rotation therewith. The periphery of the bushing 5 may have a knurled or roughened surface, and when the mass 4 is molded thereon, this provides a driving connection between them.

The mass 4 is provided on its outer end face with an elongated recess 10, disposed with its longitudinal axis generally radially of the axis of shaft 1, and a rod or screw 11 extends across the recess 10 and through the portions of the block at the ends of the recess. The portion of the screw 11 within the recess is threaded, and the end portions within the mass 4 are provided with smooth peripheral surfaces which are rotatably mounted in the mass 4. The head 12 of the screw 11 is countersunk into the mass 4 at the periphery of the latter, so as to limit movement of the screw endwise in one direction, and the other end of the screw 11 is provided with an annular groove 13 in the portion projecting into a shallow cavity 14 in the periphery of mass 4. A bifurcated clip or washer 15 is passed into straddling relation with the screw 11 in a groove 13 thereof so as to limit endwise movement of the screw 11 in the opposite direction.

A nut or block 16 is disposed in the recess 10 for endwise sliding movement therealong, and this block has a threaded passage therethrough from face to face through which the threaded portion of the screw 11 is threaded. The nut 16 is held against rotation on the screw 11 by the side walls of recess 10, and rotation of screw 11 will cause the nut 16 to move endwise along the recess 10 in one direction or the other, depending upon the direction of rotation of screw 11. The head 12 of the screw and the washer 15 prevent endwise movement of the screw without limiting its rotary movement.

Secured to the outer face of the nut 16 is a simple, bifurcated spring clamp 17 which receives and removably clamps between its arms a mercury tube switch 18. The clamp 17 is also provided with an angular arm 19 which extends around one end of the mercury tube switch 18, so as to limit its endwise movement in the clamp 17. A cushion 20, such as of felt or sponge rubber, is interposed between the arcuate end of the arm 19 and the abutting end of the switch 18. The switch 18 includes a tube or housing 21 with an elongated chamber 22 therein. Conductors 23 and 24 extend through the tube or housing 21 into one end of said chamber 22 in spaced relation to each other and extend partially across the chamber 22, and there terminate in exposed conducting portions which may be engaged by a globule or small mass 25 of a conducting liquid, such as mercury in liquid form. The outer ends of the conductors 23, 24 are connected by flexible leads 26 and 27 respectively to terminal screws 28 and 29 respectively, which in turn extend through the mass 4 and are connected to collecting rings 30 and 31 mounted on the end face of the mass 4 facing the motor. The rings 30 and 31 are concentric with the shaft.

Suitable brushes 32 and 33 are suitably mounted on the boss 8 on the end of the motor, so as to bear against the rings 30 and 31 and provide electrical connections therewith as the mass or body 4 rotates with the armature shaft. The brush 32 is connected with one end of the winding 3 of the motor, and the brush 33 is connected to a lead 34 which serves as a lead to the motor. The other end of the winding 3 is connected to a lead 35 extending exteriorly of the motor 2. Leads 34 and 35, when connected to a source of electrical current, will provide an operating current to the motor 2.

The mercury tube switch 18 is mounted eccentrically to the axis of rotation of the shaft 1, with the longitudinal axis of chamber 22 crosswise of the axis of shaft 1, so that the end of the chamber 22 containing the mercury will be at one side of the axis of the shaft 1. When said shaft is rotated, the mercury 25 will be thrown into and confined in one end of the chamber 22, as shown in Fig. 1. The liquid mercury does not wet the glass of which the tube is preferably formed, and the cross sectional area of the chamber 22 at the end having the mercury 25 therein is small enough so that the mercury will be held against lateral spreading and will have a pronounced convex meniscus on its exposed surface towards the conductors 23 and 24. These conductors extend towards the mercury to such an extent that when the device is inactive and in the position shown in Fig. 1, with the mercury in the outer end of the chamber 22, the conductors 23 and 24 will extend into the meniscus, so that the mercury will complete a circuit between the conductors 23 and 24.

Figure 3:
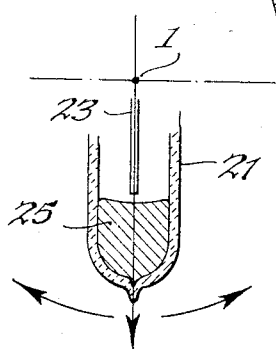
Fig. 3 is a sectional elevation through a portion of the mercury tube switch and representing the position taken by the mercury body in response to centrifugal forces when opening the circuit.

At least one of these conductors will extend only partly across the meniscus. When the motor is operated, the centrifugal forces acting on the body of mercury will tend to flatten the meniscus which is engaged with the conductors 23, 24. As the speed increases, this flattening of the meniscus will carry the mercury out of contact with at least one of the electrodes 23 and 24, as shown in Fig. 3. This opens the circuit between the electrodes 23 and 24, and thus opens the circuit through the windings of the motor 2, with the result that the speed of the motor will fall. As soon as the speed of the motor decreases the centrifugal forces acting on the mercury 25 will decrease, and the mercury will, by the action of its surface tension, tend to re-establish the normal meniscus on its exposed surface, and as this reformation of the normal meniscus continues, it will re-establish contact with the conductors 23 and 24, and thus re-establish the circuit through the motor 2.

Since the mercury mass or body 25, when rotated, is confined against all movement in the tube 21, except for the flattening of the meniscus under the action of centrifugal forces, this switch is particularly suitable for high speed motors. The leads 26 and 27 are flexible and provided with sufficient slack so that the tube 21 may be shifted endwise to different extents off center from the axis of the shaft 1 by rotation of the screw 11. As the mercury tube switch 18 is moved farther from the shaft 1, the lower will be the speed of the motor at which the switch will operate to open the circuit, for the reason that when the mercury body 25 is farther from the axis of rotation, the centrifugal forces acting thereon for a given speed will be greater. By shifting the mercury tube switch toward the axis of rotation of the shaft 1, a higher speed of rotation will be required to create the centrifugal force necessary to open the circuit of the motor. Thus, the desired speed of the motor may be predetermined and selected merely by rotation of the screw 11 in one direction or the other, so as to shift the mercury tube switch 18 toward and from the axis of rotation of the shaft 1.

The brushes 32 and 33 provide a continuous connection between the leads 26 and 27 from the mercury tube switch, and the power line and windings of the motor 2. A cap 36 may be telescoped frictionally over the end of the mass 4, so as to enclose and protect the mercury tube switch 18 and its mounting mechanism against danger from outside blows, and this cap 36 may have an aperture 37 therein alined with the head of the screw 12 so that one may insert a screwdriver in the usual slot in the head 12 of the screw 11, and enable turning of the screw 11 to adjust the mercury tube switch 18 for the desired speed.

The tube 21 is closed, and the chamber 22 thereof is exhausted of air and replaced with an inert gas, as usual with mercury tube switches, so that there will be no deterioration of the switch in use. It will be understood that the housing 21 of the switch is preferably, and may advantageously be, made of glass or similar material not wet by mercury, because of the ease in exhausting the chamber 22 of the tube and the replacement of it with an inert gas, but this housing 21 may be made of a suitable metal or other material not wet by mercury. For example, pure iron may be employed for the material of the housing 21, because such iron is ductile and easily worked, and a housing made thereof may be closed at its ends through which the conductors 23 and 24 extend by a suitable glass which has approximately the same coefficient of expansion as the material of the conductors 23 and 24. These conductors 23 and 24 are also usually made of iron or other material inert to mercury and not wet by it. When the housing 21 is made of a conducting material, such as pure iron, it is not necessary to have two electrodes 23 and 24, because in that case the housing itself may serve as one electrode or conductor, and the other conductor is insulated from the material of the housing and extended partially across the chamber 22 and slightly into the meniscus of the mercury body.

It will be understool that while the mercury tube switch is shown in series with the windings of the motor for controlling the motor, which is a common arrangement for small high speed motors, such as the electric motors of dry shavers, nevertheless, this mercury tube switch may control a relay circuit, and the relay used to control the motor circuit where the motor is a relatively large one and uses current beyond the carrying capacity of the mercury switch. By the use of a relay, the mercury tube switch may be made relatively small and yet may control a relatively large motor.

The mercury tube switch formed in this manner may also be mounted on any rotary element and may be used to control any desired circuit, so as to open or close a circuit at a critical speed, and this circuit so controlled, either alone or through a relay, may control a signal circuit or any other suitable circuit instead of a motor circuit.

While mercury is the preferred liquid as the conducting medium, because of its relatively high surface tension, which gives a pronounced meniscus, any other conducting liquid with substantial surface tension is to be considered the broad equivalent of mercury, but when other liquids are used, the materials of the housing and of the electrodes should be those which are not wet by the liquid alone.

It will be observed that when the liquid is confined in one end of the closed chamber, the exposed surface of the conducting liquid normally contacts a conductor, but is resiliently displaceable in a direction endwise of said chamber or radially of the axis of shaft 1, when subjected to the centrifugal forces created by rotation of the tube, sufficiently to interrupt contact between the liquid and a conductor and open the circuit controlled thereby. In this illustrated example of the invention, the surface tension of the mercury in forming the meniscus provides the resilience opposing displacement of the exposed face of the liquid in a direction to withdraw from contact with said conductor and open the circuit controlled thereby. It will be noted that the circuit will be made in any position in which the device is placed, and the speed at which the circuit will be opened is not dependent upon gravity or the position of the axis of rotation.

It is believed that the operation of this switch will be clear from the foregoing description and need not be given separately again.

It will be understood that various changes in details, materials, proportions and arrangements of parts, which have been herein described and illustrated in order to explain the nature of the invention, may be made by those skilled in the art within the principle and scope of the invention as expressed in the appended claims.

I claim as my invention:

1. A mercury switch comprising a housing with an elongated chamber whose wall is unwet by mercury, a body of mercury within and only partially filling said chamber, said chamber having such a transverse cross section at one end thereof that will impart to the mercury body when therein by the surface tension on that body in opposition to gravity, a pronounced convex meniscus, a conductor extending into said chamber and having solely within said meniscus portion of said body an exposed conducting surface, and conducting means electrically connected with said body to complete part of a circuit in which said mercury body, said conductor and said conducting means are in series with one another, and which may be broken by a flattening of said meniscus until it withdraws from contact with said exposed surface of said conductor.

2. A mercury switch comprising a housing with an elongated chamber whose wall is unwet by mercury, a body of mercury within and only partially filling said chamber, said chamber having such a transverse cross section at one end thereof that will impart to the mercury body when therein by the surface tension on that body in opposition to gravity, a pronounced convex meniscus, a conductor extending into said chamber and having solely within said meniscus portion of said body an exposed conducting surface, conducting means electrically connected with said body to complete part of a circuit in which said mercury body, said conductor and said conducting means are in series with one another, and which may be broken by a flattening of said meniscus until it withdraws from contact with said exposed surface of said conductor, and means mounting said housing for rotation about an axis to which the longitudinal axis of said chamber is generally radial and with said one end of the housing farther from said axis than the other end, whereby centrifugal forces acting on said body may flatten said meniscus and open said circuit through said body.

3. A circuit controller comprising a closed housing with a closed chamber therein whose wall is unwet by mercury, a body of mercury within and only partially filling said chamber, said chamber having at one end thereof a transverse cross section that will impart to the mercury confined therein, by the surface tension of the mercury in opposition to gravity, a pronounced convex meniscus, and a pair of conductors extending into said chamber and having, solely within said meniscus portion of said body, exposed conducting spaced surfaces, whereby the meniscus portion of said mercury completes an electric circuit between said conductors which may be broken by a flattening of said meniscus by centrifugal forces acting against said surface tension until it withdraws from contact with at least one of said exposed surfaces of said conductors.

4. A circuit controller comprising a closed housing with a closed chamber therein whose wall is unwet by mercury, a body of mercury within and only partially filling said chamber, said chamber having at one end thereof a transverse cross section that will impart to the mercury confined therein, by the surface tension of the mercury in opposition to gravity, a pronounced convex meniscus, a pair of conductors extending into said chamber and having, solely within said meniscus portion of said body, exposed conducting spaced surfaces, whereby the meniscus portion of said mercury completes an electric circuit between said conductors, and means mounting said housing for rotation about an axis, with said one end of said housing farthest from said axis, whereby centrifugal forces acting on said body may flatten said meniscus to open the circuit from said conductors through said mercury body.

5. A mercury switch comprising a housing with an elongated chamber whose wall is unwet by mercury, a body of mercury within and only partially filling said chamber, said chamber having such a transverse cross section at one end thereof that will impart to the mercury body when therein by the surface tension on that body in opposition to gravity, a pronounced convex meniscus, a conductor extending into said chamber and having solely within said meniscus portion of said body an exposed conducting surface, conducting means electrically connected with said body to complete part of a circuit in which said mercury body, said conductor and said conducting means are in series with one another, and which may be broken by a flattening of said meniscus until it withdraws from contact with said exposed surface of said conductor, and means mounting said housing for rotation about an axis to which the longitudinal axis of said chamber is generally radial and with said one end of the housing farther from said axis than the other end, whereby centrifugal forces acting on said body may flatten said meniscus and open said circuit through said body, said mounting means including a holder for said housing, a rotary base, and means carried by the base and interacting with said holder for shifting the latter in a direction toward and from the axis of rotation to vary the centrifugal forces acting on the body of mercury for any given speed of rotation of said housing about said axis.

6. A mercury switch comprising a glass tube with an elongated, closed chamber, a body of mercury within and only partially filling said chamber at one end thereof, said one end of said chamber having a transverse cross section which will impart to the mercury confined therein, by the action of the surface tension of the mercury in opposition to gravity, a pronounced convex meniscus on its exposed face, a pair of conductors extending into said chamber from the end thereof opposite said one end and terminating within said mercury and at least one of them solely within said meniscus portion of said mercury body when said mercury is in said one end, whereby the mercury will normally complete an electric circuit between said conductors in all possible positions of the tube, whereby when the meniscus is flattened by centrifugal forces acting thereon, the circuit will be broken between the meniscus and one of said conductors.

7. A mercury switch comprising a housing with an elongated chamber whose wall is unwet by mercury, a body of mercury within and only partially filling said chamber, said chamber having such a transverse cross section at one end thereof that will impart to the mercury body when therein, by the surface tension on that body in opposition to gravity, a pronounced convex meniscus, a conductor extending into said chamber and having solely within said meniscus portion of said body an exposed conducting surface, conducting means electrically connected with said body to complete part of a circuit in which said mercury body, said conductor and said conducting means are in series with one another, and which may be broken by a flattening of said meniscus until it withdraws from contact with said exposed surface of said conductor, said exposed conducting surface being spaced from the bottom of said meniscus a distance sufficient to cause the meniscus to break contact with said exposed surface when said meniscus is flattened by centrifugal forces acting thereon.

8. A circuit controller comprising a tube with a closed chamber whose wall is unwet by mercury, a body of liquid mercury within and only partially filling said chamber and when within one zone of said chamber having a pronounced convex meniscus on its exposed face due to the surface tension of the mercury acting in opposition to gravity, a conductor in said chamber and having an exposed portion within said meniscus only of said mercury, when said mercury is in said zone, and spaced far enough from the base of the meniscus that when the meniscus is flattened by centrifugal forces against its surface tension, contact is broken between said exposed conductor portion and said mercury, and means for connecting said mercury and said conductor in series.

9. A circuit controller comprising a tube with a closed chamber whose wall is unwet by mercury, a body of liquid mercury within and only partially filling said chamber and when within one zone of said chamber having a pronounced convex meniscus on its exposed face due to the surface tension of the mercury acting in opposition to gravity, a conductor in said chamber and having an exposed portion within said meniscus only of said mercury, when said mercury is in said zone, and spaced far enough from the base of the meniscus that when the meniscus is flattened by centrifugal forces against its surface tension, contact is broken between said exposed conductor portion and said mercury, means for connecting said mercury and said conductor in series in part of an electric circuit to be controlled, and means mounting said tube for rotation about an axis with said chamber zone constituting a pocket facing said axis and at one side thereof, whereby when said tube is rotated about said axis, the centrifugal forces on said mercury will tend to flatten said meniscus on its exposed face while the mercury remains relatively immovable in said chamber pocket.

10. A circuit controller comprising a tube with a closed chamber whose wall is unwet by mercury, a body of liquid mercury within and only partially filling said chamber and when within one zone of said chamber having a pronounced convex meniscus on its exposed face due to the surface tension of the mercury acting in opposition to gravity, a conductor in said chamber and having an exposed portion within said meniscus only of said mercury, when said mercury is in said zone, and spaced far enough from the base of the meniscus that when the meniscus is flattened by centrifugal forces against its surface tension, contact is broken between said exposed conductor portion and said mercury, means for connecting said mercury and said conductor in series, a spring clamp removably mounting said tube, a rotatable support, means mounting said clamp on said support for movement of it and said tube towards and from the axis of rotation of said support with said zone of said chamber forming a pocket facing at its open side towards said axis, and means for maintaining electrical connections to said conductor and mercury in all rotary positions of said support.

11. A circuit controller comprising a tube with an elongated, closed chamber whose wall is unwet by mercury, a body of liquid mercury within and only partially filling said chamber, and when in one end of said chamber having a pronounced convex meniscus on its exposed face, due to the action thereon of its surface tension in opposition to gravity, a conductor extending from approximately the other end of said chamber along said chamber and only slightly into said meniscus of the mercury at the other end of the chamber, and means for connecting said mercury and said conductor in series in all locations of said mercury in said chamber.

12. A circuit controller comprising a tube with an elongated, closed chamber whose wall is of insulating material and unwet by mercury, a body of liquid mercury within and only partially filling said chamber, and when in one end of said chamber having a pronounced convex meniscus on its exposed face, due to the action thereon of its surface tension in opposition to gravity, a pair of conductors extending in spaced, side by side, relation to each other from the other end portion of said chamber, along said chamber and into said mercury when the latter is confined in said one chamber end, at least one of said conductors extending only slightly into said meniscus of said mercury at said one chamber end, and means for connecting said conductors in series in part of an electric circuit to be controlled, whereby when said tube is rotated in a manner to confine said mercury in said one chamber end by centrifugal forces, said forces will tend to flatten said meniscus, and when strong enough will interrupt contact between said mercury and said one conductor to open said circuit between said conductors.

13. A circuit controller comprising a tube with an elongated, closed chamber whose wall is of insulating material and unwet by mercury, a body of liquid mercury within and only partially filling said chamber, and when in one end of said chamber having a pronounced convex meniscus on its exposed face, due to the action thereon of its surface tension in opposition to gravity, a pair of conductors extending in spaced, side by side, relation to each other from the other end portion of said chamber, along said chamber and into said mercury when the latter is confined in said one chamber end, at least one of said conductors extending only slightly into said meniscus of said mercury at said one chamber end, means for connecting said conductors in series in part of an electric circuit to be controlled, and means mounting said tube for rotation about an axis crosswise of the longitudinal axis of said tube and with said one chamber end at one side of and facing said rotation axis, whereby the centrifugal forces acting on said mercury when the tube is rotated will tend to flatten said meniscus against its surface tension and when strong enough will interrupt the circuit between said conductors through said mercury.

14. A circuit controller comprising a tube with an elongated, closed chamber whose wall is of insulating material and unwet by mercury, a body of liquid mercury within and only partially filling said chamber, and when in one end of said chamber having a pronounced convex meniscus on its exposed face, due to the action thereon of its surface tension in opposition to gravity, a pair of conductors extending in spaced, side, by side, relation to each other from the other end portions of said chamber, along said chamber and into said mercury when the latter is confined in said one chamber end, at least one of said conductors extending only slightly into said meniscus of said mercury at said one chamber end, means for connecting said conductors in series in part of an electric circuit to be controlled, and means mounting said tube for rotation about an axis crosswise of the longitudinal axis of said tube and with said one chamber end at one side of and facing said rotation axis, whereby the centrifugal forces acting on said mercury when the tube is rotated will tend to flatten said meniscus against its surface tension and when strong enough will interrupt the circuit between said conductors through said mercury, said mounting means including a support for said tube which is adjustable to move said tube endwise of itself toward and from said axis of rotation to vary the speed of rotation necessary to open said circuit by a flattening of said meniscus.

15. A circuit controller comprising a tube with a closed, elongated chamber, a conducting liquid within and only partially filling said chamber, a conductor extending into said chamber and only slightly into the exposed face of said liquid when the latter is confined in one end of said chamber by rotation of said tube about an axis spaced from said one end, said exposed face of said liquid being displaceable relatively to said conductor within said chamber, while said liquid remains confined within said one chamber end, by centrifugal forces acting on said liquid sufficiently to break contact with said conductor when said centrifugal forces acting on said liquid exceed a selected amount, and means for connecting said liquid and conductor in series.

16. A circuit controller comprising a tube with a closed chamber whose wall is unwet by mercury, a body of liquid mercury within and only partially filling said chamber and when within one zone of said chamber having a pronounced convex meniscus on its exposed face due to the surface tension of the mercury acting in opposition to gravity, a conductor in said chamber and having an exposed portion within said meniscus only of said mercury, when said mercury is in said zone, and spaced far enough from the base of the meniscus that when the meniscus is flattened by centrifugal forces against its surface tension, contact is broken between said exposed conductor portion and said mercury, means for connecting said mercury and said conductor in series, a rotatable support, an element mounting said tube and in turn mounted on said support for movement to different distances from the axis of rotation of said support with said zone of said chamber forming a pocket facing at its open side towards said axis whereby by setting said element and tube at different distances from said axis, the speed of rotation at which the mercury meniscus will separate from said exposed conductor portion may be varied.

HARRY L. LAMBERT.